July 24, 1951 G. WOOD 2,561,765
SYNCHRONOUS MECHANICAL CLUTCH
Filed Feb. 28, 1948 2 Sheets-Sheet 1

INVENTOR
GEORGE WOOD
By Hazeltine, Lake & Co
AGENTS

July 24, 1951  G. WOOD  2,561,765
SYNCHRONOUS MECHANICAL CLUTCH
Filed Feb. 28, 1948  2 Sheets-Sheet 2

INVENTOR
GEORGE WOOD
B. Hazeltine, Lake & Co.
AGENTS

Patented July 24, 1951

2,561,765

UNITED STATES PATENT OFFICE 2,561,765

SYNCHRONOUS MECHANICAL CLUTCH

George Wood, London, England, assignor to Vickers-Armstrongs Limited, London, England, a British company Application February 28, 1948, Serial No. 11,922
In Great Britain March 19, 1947

4 Claims. (Cl. 192—53)

This invention relates to synchronous clutches embodying means whereby two independent rotary elements or co-axial shafts normally running at only approximately similar speeds may be positively coupled together, as distinct from being friction-clutch coupled, the clutch being operated by hand or any suitable automatic control gear. The invention is intended for use in the transmission of heavy loads at high torque, e. g. as in the propulsion of sea-going vessels in which when going from ahead to astern, the driving shaft is slowed down to enable a reverse gear to be brought into operation by means of one or more clutches, the driven shaft, e. g. the screw carrying shaft, under these conditions maintaining a speed due to the way of the vessel and/or its own momentum which temporarily is greater than that of the driving shaft. However other fields of use are also contemplated where similar conditions can apply or be brought about.

According to the present invention the clutch comprises a pair of clutch members shaped to inter-engage to effect a positive coupling across the shafts, one of said clutch members being fixed to one shaft and the other being axially slidable relative to its shaft towards and away from the other clutch member but restrained against rotation relative to its shaft, a screw thread formed on the latter mentioned shaft between the two clutch members, a nut on said thread, a friction drive annular member engaging the end face of the nut opposed to the said clutch member fixed to its associated shaft, and spring means forming a driving connection between the annular member and the fixed clutch member and urging said friction drive annular member into effective driving engagement with said nut and adapted to yield to axial displacement of the nut consequent upon the speeds of the two shafts crossing so as to move the nut by reversing the direction of the thrust of the screw thread thereon.

Figure 1:
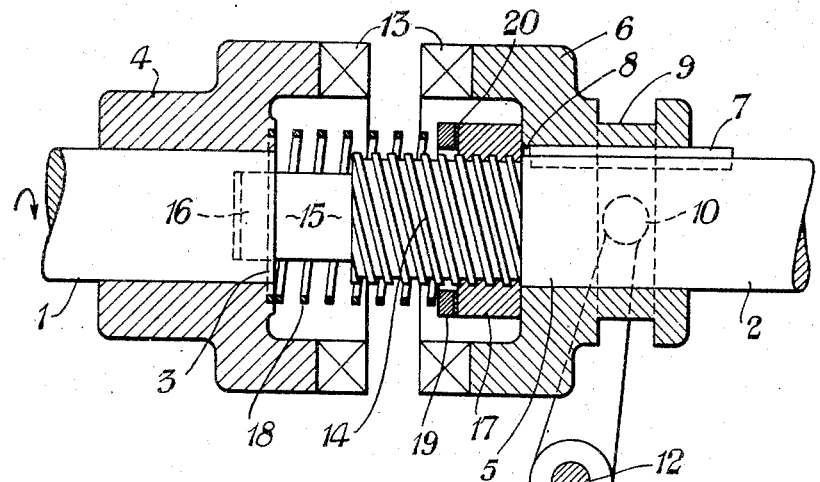
Figure 2:
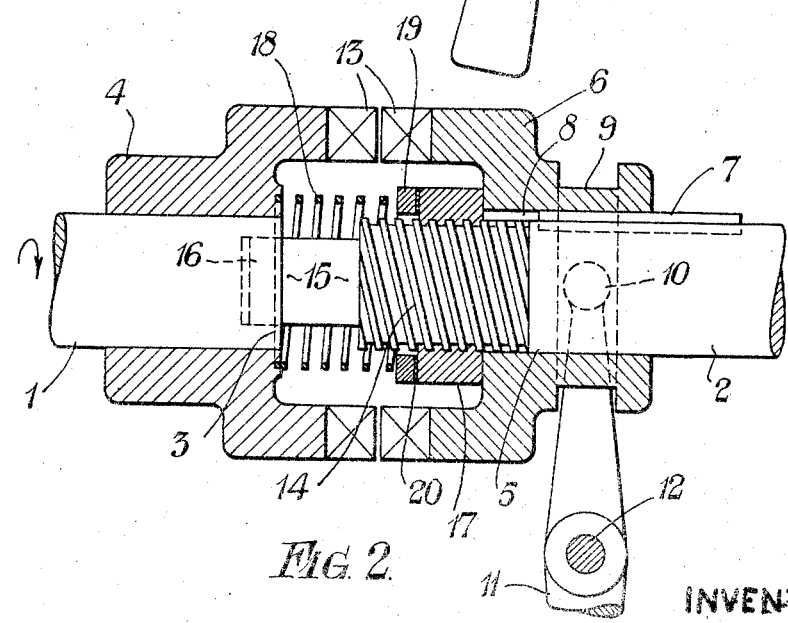
Figure 3:
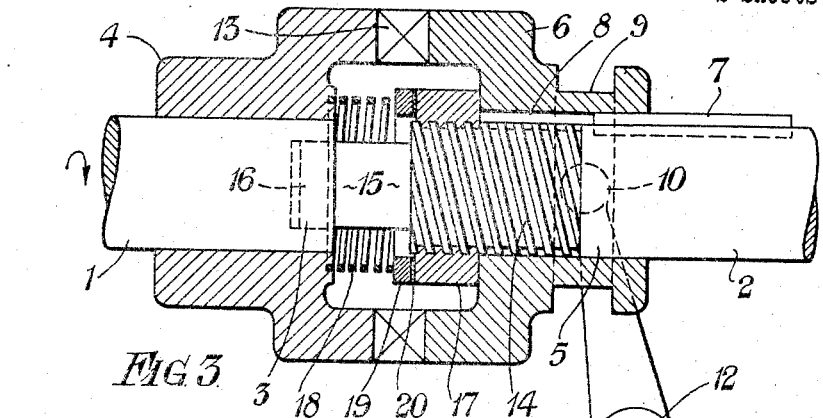
Figure 4:
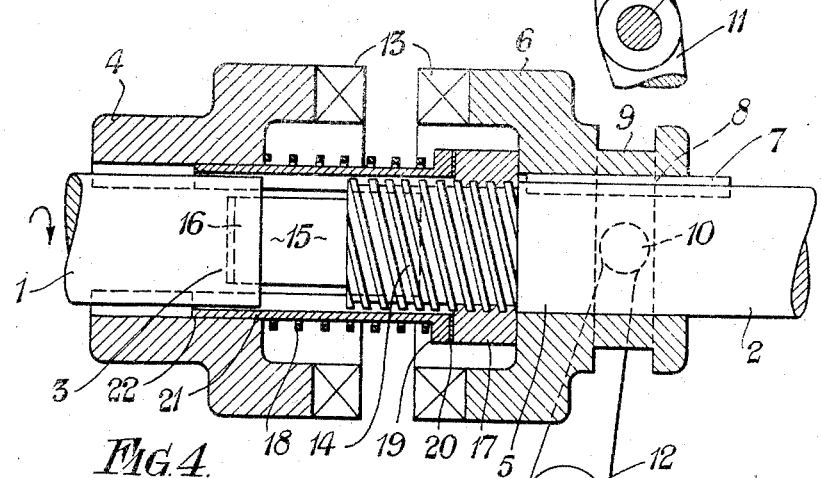
Figure 5:
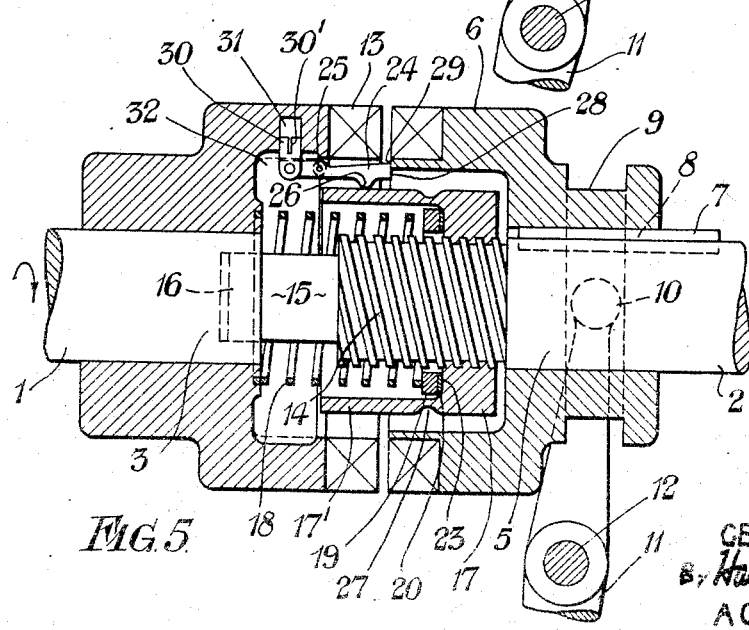

Three embodiments of the invention are described hereinafter with reference to the accompanying drawings in which:

Fig. 1 is an axial cross-section of the first embodiment in the fully disengaged position, Fig. 2 is the same axial cross-section of the same embodiment in the initial, frictional coupling position, Fig. 3 is the same axial cross-section of the same embodiment in the final, positively engaged, position, Fig. 4 is an axial cross-section of the second embodiment in the fully disengaged position, Fig. 5 is an axial cross-section of the third embodiment in the initial, frictional coupling, position, this embodiment being applicable to cases where the speeds of the two shafts is high and is comparatively independent of conditions of running, i. e. the shafts can be engaged or de-clutched at any time provided the relative shaft speeds are within certain prescribed limits; thus ensuring that axial movement of the clutch will take place only when the relative speeds render the operation safe.

In the first embodiment of the invention the elements to be operatively coupled comprise two shafts viz. a motor or driving shaft 1 providing the motive power, and a driven shaft 2 to which the said power is transmitted.

The shaft 1 carries at its end 3 a clutch member 4 which is rigidly attached to and rotates with said shaft, by one of the usual means (not shown).

The shaft 2 carries at the end 5 a clutch member 6 adapted to slide axially on the shaft 2 but being constrained to rotate with it by means of a key 7, fixed to the said shaft, in sliding co-operation with a keyway 8 in the said member 6. The clutch member 6 is also provided with an annular recess 9 adapted to co-operate with a pair of transversely projecting studs 10 on the forked end of a lever 11 having as a fulcrum the stud 12 whereby movement of said lever causes the member 6 to slide axially along the shaft 2. The clutch members 4 and 6 are further provided with dogs 13 adapted to co-operate to provide positive engagement consequent upon axial movement of the member 6 into fully engaged position as shown in Fig. 3. The shaft 2 is provided, at the end 5, with an extension or spigot comprising a threaded portion 14 together with a concentric plain portion 15 journalled in a recess 16 in the shaft 1. The journalling of the portion 9 of the shaft 2 in the shaft 1 ensures positive transverse interlocation of the two shafts and resists any tendency, for the shafts to whip under load, due to bad alignment or lack of symmetry in the clutch members.

Disposed upon the portion 14 of the shaft 2 is a nut 17 co-operating with the threads on the said portion 14. If the shaft 1 rotates in the direction shown the threads are right handed, and if in the opposite direction are left handed.

The member 4 has fixedly attached to, and projecting axially from it a helical spring 18, said spring being fixed at the end remote from the member 4 to an annulus 19, said annulus, being provided, on the face adjacent to the nut 17, with a layer of durable friction material, said spring and annulus being of sufficient internal diameter to permit rotation of the shaft 2 without engaging with the portions 14 or 15 of the said shaft. The spring 18 is of resilience such that in the fully extended portion (as shown in Fig. 1) it exerts no axial pressure on the annulus 19 sufficient to cause it to rotate the shaft 2, by means of the friction layer 20 and the nut 17, but allows slipping to take place freely between said layer and said nut.

In the de-clutched position shown in Figure 1, if the shaft 1 is rotated in the direction of the arrow, the spring 18 will rotate the nut 17 moving it along the shaft 2 (i. e. thread 14) until the spring is fully released. In this position the nut 17 forms a stop preventing the member 6 moving into engagement with member 4, and, as hereinbefore described, the said spring being fully extended exerts no axial pressure on the annulus 19 which slips freely.

With the shaft 2 rotated in the same direction as the arrow, the first effect of trying to move the clutch member 6 into engagement is to produce a pressure between the nut 17 and member 6, and immediately the speed of the shaft 2 exceeds that of shaft 1, the effect of this pressure is to augment the spring load making the relative rotation of the annulus 19 rotate the nut 17 in a direction away from clutch member 6 so that the member 6 can be moved into a "nearly engaging" position, as shown in Figure 2, thus enabling the clutch to move into engagement whilst the relative speeds of the two shafts is sufficiently small to allow of smooth movement into the engaged position shown in Figure 3. In this connection, the speed of the driven shaft 2 may be made relatively greater than that of the driving shaft 1 by rotating the said driving shaft at a decreasing rate during the initial engagement, when the speed of rotation of the driven shaft, as maintained by its momentum, will eventually exceed that of the driving shaft. The rate of engagement may be thereby regulated by the rate of decrease of speed of rotation of the driving shaft.

In the second embodiment (shown in Fig. 4) a clutch as hereinbefore described is characterised by the combination of the annulus 19 with one end of a sleeve 21, the other end of said sleeve being engaged in the member 4 fixed to the shaft 1, said sleeve being adapted to move axially, relatively to the said member, but constrained by a key 22 to rotate with it. The helical spring 18 is not fixed at its ends to the members 4 and 14 and is disposed about the said sleeve and functions as hereinbefore described in the first embodiment.

In the third embodiment (shown in Fig. 5) a clutch, as hereinbefore described in the first embodiment, is characterised by the provision therewith of means to prevent final engagement of the clutch members below a predetermined speed of the driving shaft. The nut 17 is formed with a cylindrical skirt 17', the annulus 19 being interposed between the end of the spring 18 remote from the member 4 and the annular surface 23 of the said nut, the spring 18 being disposed as in the first embodiment.

The fixed clutch member 4 is provided with a stop lever 24 pivoted on a pivot 25 so as to allow it to turn in a radial plane.

The pivot 25 is carried by a lug or lugs (not shown) depending from the inner annular surface of the clutch member 4. The stop lever 24 has on its inner face, at the end remote from the said member, a projection 26 adapted to co-operate with an annular groove 27 on the periphery of the nut skirt. The dimensions of the nut skirt, the internal diameter of the member 6 and the stop lever 24 are so relatively proportioned, that the face 28 of the said stop lever engages with the end face 29 of the member 6, thereby preventing the member 6 being moved axially into engagement, until the projection 26 has moved into the groove 27. The internal diameter of the member 6 is further adapted to allow it to slide over said stop lever with a small clearance when the projection 26 is engaged with the groove 27. The stop lever 24 is provided at the end remote from the member 6, with a dash-pot control comprising a heavy piston 30, pivotally attached to said stop lever, co-operating with a radial cylindrical recess 31 formed in the recessed inner wall 32 of the member 4. The recessed part 32 is a shallow annular recess, formed in the inner wall of the member 4, and contains a small quantity of oil which is constrained therein by centrifugal force. The piston 30 has a small longitudinal groove 30' to allow oil forced into the cylinder 31 by centrifugal force to leak slowly past said piston when the centrifugal force acting on said piston becomes sufficiently large, the amount of clearance between the piston 30 and cylinder 31 being made to suit the normal speed of revolution of the clutch at the time of engagement. The piston 30 and the cylinder thereby combine to form a dash-pot loaded by centrifugal force.

The mode of operation of this embodiment differs from the embodiments hereinbefore described only in that the nut 17 must move into its fully engaged position, before the clutch member 6 can be clutched. The centrifugally operated levers 24 ensure that the engagement of the clutch members can be engaged only when the high speed rotating shafts have relative speeds within prescribed limits, thus ensuring that axial movement of the clutch member 6 will take place only when the relative speeds render the clutching operation safe.

To disengage the clutch, the member 6 is first slid out of engagement with the member 4. The driving shaft 1 is then accelerated, or the shaft 2 is decelerated or braked, when the nut groove 27 is forced out of engagement with the projection 26 by the combined thrust of the spring 18 and the screw-feed action of the threads on the portion 14 of the shaft 2.

Again referring to Figure 5, assuming the relative speeds of the shafts 1 and 2 to be fluctuating and considering the moment when shaft 2 is rotating at a speed less than the speed of shaft 1, then the nut 17 will be rotated in a direction making it screw along the shaft towards shaft 1, and when the position of the groove 27 coincides with projection 26 the stop will fall into the clear position to allow clutch member 6 to be moved into engagement. Time for this clutch movement to take place can occur only when the speeds of shafts 1 and 2 synchronise sufficiently to enable the projection 26 to remain in the groove 27 for sufficient time to allow the movement of the clutch to take place, i. e. if the speed of shaft 1 continued to exceed that of shaft 2, the nut would, in moving toward the shaft 1 (i. e. to the left), allow the projection to fall into the groove, but only momentarily and would then continue its movement to the left until the spring was fully compressed when the annulus 19 would slip relatively to the nut 17.

It would remain in this position until the speed of shaft 2 exceeded the speed of shaft 1 when the nut would be translated in the opposite direction, i. e. towards the right and again as the groove 27 comes opposite to the projection 26 the stop would fall into the clear position.

From this it will be observed that, only when the speeds of the two shafts are sufficiently close to allow the projection 26 to remain in the groove 27 sufficiently long to enable the clutch member 6 to be moved its full axial travel, can engagement take place. Further, the speed at which the projection 26 can move into the groove 27 is determined by the movement of the piston 30, the speed of which is controlled by the oil leakage groove 30.

For example, assuming shaft 1 to be rotating at any speed and that it is agreed that smooth engagement of the clutch can take place if the difference in shaft speeds does not exceed 20 R. P. M., also that the projection 26 can linger in groove 27 whilst the nut makes one eighth of a revolution on the shaft, this corresponds in time to $$\frac{1}{20 \times 8} = \frac{1}{160} \text{ min. } \therefore \frac{60}{160} = \frac{3}{8} \text{ sec.}$$

thus the groove is made to ensure that the oil leakage required for full movement of the piston would need at least 3/8 second.

In all the embodiments described herein the threads on the extension 14 may be of any form but are preferably a multiple start thread of square section. While a simple manual lever control of the movable clutch member is shown, it is not intended that the present invention be limited thereto and any known form of control may be employed.

In the third embodiment a series of stops 24 may be symmetrically disposed round the inner face of the member 4 so that their resultant centre of gravity lies in the axis of the shafts, since the said stops would be radially equidistant from the said axis and of equal mass, for all practical purposes, the clutch would then be both dynamically and statically balanced. It will be seen that the movement of the dash-pot piston 30 controls the relative speed of the members at the time of positive engagement. The mass of the piston, the viscosity of the working fluid, the fit of the piston and the size of the leakage groove may be so adapted and arranged to bring this relative speed to a predetermined value.

I claim:

1. A synchronous clutch for operatively coupling and uncoupling a pair of co-axial shafts comprising a pair of clutch members on the shafts and shaped to inter-engage positively to effect a positive couple across the shafts, one of said clutch members being fixed to one shaft and the other being axially slidable but restrained against rotation relative to the other shaft, a feed screw in relatively fixed axial prolongation of the latter mentioned shaft so as to extend between the two clutch members, a nut on said feed screw and opposed to the axially slidable clutch member so as to receive axial pressure from said slidable clutch member when the clutch is initially operated towards the clutching position, a friction drive annular member loose about said screw and idly opposing during full separation of the two clutch members the end face of the nut opposed to the said clutch member fixed to its associated shaft but adapted to make driving engagement with the nut consequent upon the slidable clutch member being initially operated towards the clutching position, and spring means serving to establish a driving couple across the shaft carrying the relatively fixed clutch member and said friction drive annular member whereby effective driving engagement of said annular member with said nut is made consequent upon said initial operation of the slidable clutch member, whereby subject only to the speeds of the two shafts crossing a driving couple to the nut from the shaft carrying the relatively fixed clutch member via the said annular member and spring means is established so as to move the nut towards the said clutch member fixed to its associated shaft by reversing the direction of the thrust of the screw on the nut to permit the slidable clutch member to follow the nut and inter-engage with the other clutch member.

2. A synchronous clutch for operatively coupling and uncoupling a pair of co-axial shafts comprising a pair of clutch members shaped to inter-engage to effect a positive couple across the shafts, one of said clutch members being fixed to one shaft and the other being axially slidable relative to its shaft towards and away from the other clutch member but restrained against rotation relative to its shaft, a screw thread formed in axial prolongation of the latter mentioned shaft so as to extend between the two clutch members, a nut on said thread acting as a stop against the slidable clutch member during full de-clutching, an annular collar loose on said thread, a friction layer between said collar and said nut and adapted to slip idly during full de-clutching, a coiled compression spring interposed between the clutch member fixed to its shaft and said collar and producing a drive from said latter shaft through said friction layer to the nut so as, consequent upon the speeds of the two shafts crossing, and upon axial pressure being applied to the nut by initial actuation of the slidable clutch member towards the clutching position to translate the nut towards the clutch member fixed to its shaft and said spring yielding to such axial displacement of the nut.

3. A synchronous clutch for operatively coupling and uncoupling a pair of co-axial shafts comprising a pair of clutch members shaped to inter-engage to effect a positive couple across the shafts, one of said clutch members being fixed to one shaft and the other being axially slidable relative to its shaft towards and away from the other clutch member but restrained against rotation relative to its shaft, a screw thread formed on the latter mentioned shaft between the two clutch members, a nut on said thread, a friction drive annular member engaging the end face of the nut opposed to the said clutch member fixed to its associated shaft, and spring means urging said friction drive annular member into effective driving engagement with said nut and adapted to yield to axial displacement of the nut consequent upon the speeds of the two shafts crossing so as to move the nut by reversing the direction of the thrust of the screw thread thereon, and means to positively oppose inter-engagement of the two clutch members below a predetermined speed of the driving one of the two shafts, said means comprising a centrifugally displaceable stop carried by one clutch member and positioned to form an abutment against the other clutch member before the two clutch members can be inter-engaged, a damping device with the clutch member carrying said stop yieldingly opposing movement of the stop away from its operative position.

4. A clutch according to claim 3 wherein said stop comprises one end of a lever pivoted to the clutch member carrying it and a plunger carried by the other end of the lever, said plunger sliding in an oil charged radial bore in said clutch member.

GEORGE WOOD.

REFERENCES CITED

The following references are of record in the file of this patent:

UNITED STATES PATENTS

| Number | Name | Date |
|---|---|---|
| 1,581,292 | Ross | Apr. 20, 1926 |
| 2,179,540 | McC. Burdick | Nov. 14, 1939 |
| 2,401,179 | Orr | May 28, 1946 |